Figure 1:
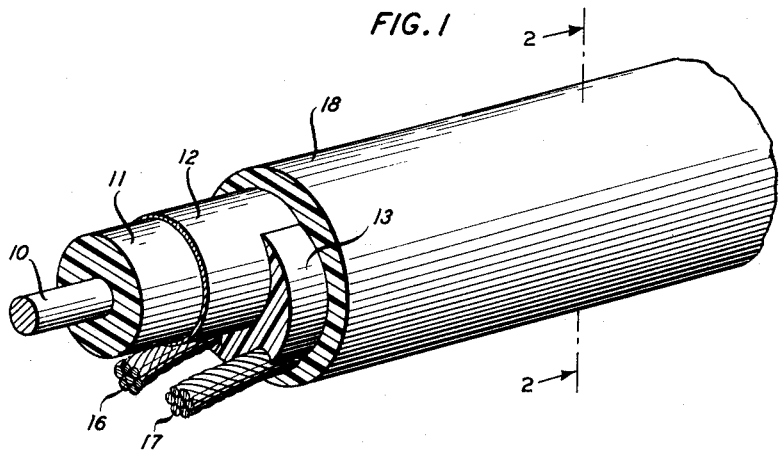

Feb. 6, 1962   R. M. RILEY   3,020,334
ELECTRICAL CABLE
Filed Oct. 1, 1959

INVENTOR
R. M. RILEY
BY
ATTORNEY

United States Patent Office 3,020,334
Patented Feb. 6, 1962

3,020,334
ELECTRICAL CABLE
Robert M. Riley, Madison, N.J., assignor to Bell Telephone Laboratories, Incorporated, New York, N.Y., a corporation of New York
Filed Oct. 1, 1959, Ser. No. 843,820
2 Claims. (Cl. 174—107)

This invention relates to an ocean telephone cable and more particularly to an armorless coaxial cable intended for the transmission of electrical intelligence under deep water.

The object of this invention is to provide an ocean telephone cable which will be substantially free from the strains and stresses of twisting and untwisting both during the laying operation and also after it has been installed on the ocean floor.

A further object of the invention is the provision of an armorless ocean cable of high quality having a low loss electrical transmission path and so constructed that it will have the necessary mechanical strength for deep water telephone cable installation.

A still further object of the invention is the provision of an ocean telephone cable so fabricated that it readily lends itself to cables of comparatively small size.

It is with the well-known problem of reducing or eliminating the twisting action of ocean telephone cable and the consequent damage to the cable both during installation and after it is in place on the ocean floor, that this invention is concerned.

It has long been a problem in the laying of submarine or ocean telephone cable, due to the structure thereof, to avoid the deleterious effects on the cable and its subsequent operation due to the strains and stresses set up in the cable by twisting and untwisting due to the tension on the cable.

The preferred embodiment of my invention contemplates an armorless deep water telephone cable, of the coaxial type, wherein the strength members comprise a plurality of longitudinally extending helically wound strands each strength member having a different direction of lay from that of its neighbor.

The strength members are positioned in spaced relation with respect to each other and with respect to the outer conductor of the cable. They are imbedded in the insulation of the cable substantially midway between the outer surface of the cable and the outer surface of the outer conductor.

Figure 2:
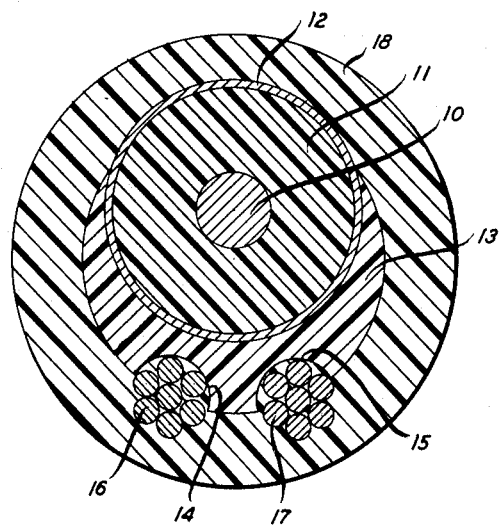

The invention will be more clearly understood from the following detailed description when read with reference to the drawing, in which:

FIG. 1 is a fragmentary view in perspective of the cable structure of my invention with portions broken away; and FIG. 2 is an enlarged cross-sectional view taken on line 2—2 of FIG. 1.

In the embodiment of my invention in its preferred form, as exemplified in FIGS. 1 and 2 of the drawing, the cable structure comprises an inner or center conductor 10 constructed of a material having a high degree of electrical conductivity, for example, copper or the like. Surrounding the conductor 10 is a layer or jacket 11 of suitable insulating material, for example, polyethylene, and having a wall thickness substantially greater than the diameter of the conductor 10.

A metal sheath 12 of tubular configuration comprises the outer conductor, and is fabricated from a material having a high conductivity, for example, copper, and firmly embraces the insulating jacket 11.

Positioned in contact with the outer conductor 12 and extending longitudinally with respect thereto, is the member 13, which may be formed of a flexible plastic material resistant to flow, such as polyethylene, either thermoplastic or cross-linked by irradiation or chemical means. This member, as shown in the figures, has a substantially arcuate or crescent-shaped cross section and only partially embraces the conductor 12. Located on the outer surface of the member 13 and extending longitudinally with respect thereto are the parallel grooves 14 and 15. These grooves are in spaced relation with respect to each other and have a substantially semicircular configuration. Positioned in the grooves 14 and 15 as shown, are the strength members 16 and 17 which comprise a plurality of high strength metallic strands, for example, steel, twisted together to form a stranded cable.

As shown in FIG. 1, the strands of wire which make up the strength members 16 and 17 are wound so that one has a right-hand lay and the other a left-hand lay, i.e., the strength member designated 16 is wound in a left-hand direction and the strength member designated 17 is wound in a right-hand direction. Thus, due to this novel structure, twisting action of the cable is avoided when it is subjected to tension during the laying of the cable and after it has been positioned on the ocean floor.

Since the cable is not subjected to twisting, the outer conductor 12 is preferably made tubular instead of helical with the consequent result that lower loss will result during the transmission of intelligence.

Positioned over the assembly, heretofore described, and embracing the whole, is an outer jacket 18 of suitable insulating material, for example, polyethylene. This outer jacket has a substantial thickness and the outer surface may be concentric with the outer surface of the spacer. It may be applied in any suitable manner, for example, by extrusion.

While I have shown and described the preferred embodiment of my invention, it is understood that various modifications and changes may be made therein without departing from the spirit and scope of the invention. For example, I am not to be limited to the number of strength members provided or their position with respect to each other.

What is claimed is:

1. An armorless ocean telephone cable comprising an inner electrical conductor, a layer of insulation surrounding said conductor, an outer conductor over said insulation, an elongated spacer member having a substantially crescent-shaped cross section extending longitudinally with respect to said cable and positioned over a major portion of said outer conductor, a plurality of spaced apart strength members comprising parallel metal strands each having an opposite lay, positioned on said spacer member, at a point of its greatest thickness, and an outer layer of insulating material surrounding the whole and embracing said strength members, said outer layer of insulating material having its greatest thickness where it embraces the metal strands.

2. An armorless ocean telephone cable comprising an inner electrical conductor, a layer of insulation surrounding said conductor, an outer conductor over said insulation, an elongated spacer member having a substantially crescent-shaped cross section and having parallel grooves extending longitudinally with respect to said cable and positioned over the major portion of said outer conductor, a plurality of spaced apart strength members comprising parallel metal strands each having an opposite lay, positioned in said grooves on said spacer member, at a point of its greatest thickness, and an outer layer of insulating material surrounding the whole and embracing said strength members, said outer layer of insulating material having its greatest thickness where it embraces the metal strands.

References Cited in the file of this patent

UNITED STATES PATENTS

| | | |
|---|---|---|
| 1,201,290 | Harrison | Oct. 17, 1916 |
| 2,074,777 | Coupier | Mar. 23, 1937 |
| 2,795,641 | Rowell | June 11, 1957 |
| 2,849,526 | Brockbank | Aug. 26, 1958 |

FOREIGN PATENTS

| | | |
|---|---|---|
| 483,274 | Great Britain | Apr. 12, 1938 |
| 747,691 | Great Britain | Apr. 11, 1956 |